United States Patent
Chu et al.

(10) Patent No.: US 12,104,024 B2
(45) Date of Patent: Oct. 1, 2024

(54) POLYVINYL ALCOHOL-SIZED FILLERS FOR REINFORCING PLASTICS

(71) Applicant: Zoltek Corporation, Bridgeton, MO (US)

(72) Inventors: Philip F. Chu, St. Peters, MO (US); Philip L. Schell, Chesterfield, MO (US); David M. Corbin, St. Peters, MO (US); Shigeo Iwasawa, Chesterfield, MO (US)

(73) Assignee: Zoltek Corporation, Bridgeton, MO (US)

( * ) Notice: Subject to any disclaimer, the term of this patent is extended or adjusted under 35 U.S.C. 154(b) by 825 days.

(21) Appl. No.: 16/637,106

(22) PCT Filed: Jul. 18, 2018

(86) PCT No.: PCT/US2018/042677
§ 371 (c)(1),
(2) Date: Feb. 6, 2020

(87) PCT Pub. No.: WO2018/176067
PCT Pub. Date: Sep. 27, 2018

(65) Prior Publication Data
US 2021/0363313 A1    Nov. 25, 2021

Related U.S. Application Data

(60) Provisional application No. 62/541,834, filed on Aug. 7, 2017.

(51) Int. Cl.
*C08J 5/06* (2006.01)
*C08J 5/04* (2006.01)
(Continued)

(52) U.S. Cl.
CPC ............... *C08J 5/06* (2013.01); *C08J 5/042* (2013.01); *C08J 5/045* (2013.01); *C08K 3/26* (2013.01);
(Continued)

(58) Field of Classification Search
CPC ............. D06M 15/333; C08L 23/12; C08L 77/00–12; C08L 63/00–10; C08J 5/06;
(Continued)

(56) References Cited

U.S. PATENT DOCUMENTS 3,224,993 A    12/1965    Wynne
4,185,138 A     1/1980    Graham
(Continued)

FOREIGN PATENT DOCUMENTS

CN    101815746 A     8/2010
CN    103476843 A    12/2013
(Continued)

OTHER PUBLICATIONS

Toho Tenax, Delivery programme and characteristics for Tenax STS filament yarn (Year: 2010).*
(Continued)

*Primary Examiner* — Kregg T Brooks
(74) *Attorney, Agent, or Firm* — Buchanan Ingersoll & Rooney PC

(57) ABSTRACT

A sized reinforcing filler, comprising a filler and a sizing agent disposed on at least a portion of the filler, to be used for reinforcement for plastics is disclosed. The sizing agent is based upon at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. The polyvinyl alcohol is useful as a size for all types of fibers and particles to (Continued)

reinforce all types of commodity and engineering plastics, particularly polyolefin resins, to form polymer composites. As such, polymer composites reinforced with such sized reinforcing fillers, as well as articles, components, and products including such polymers composites, are also disclosed.

11 Claims, 5 Drawing Sheets

(51) Int. Cl.
    *C08K 3/26*     (2006.01)
    *C08K 9/08*     (2006.01)

(52) U.S. Cl.
    CPC ............. *C08K 9/08* (2013.01); *C08J 2323/12* (2013.01); *C08J 2377/06* (2013.01); *C08J 2429/04* (2013.01); *C08J 2451/06* (2013.01); *C08J 2463/00* (2013.01); *C08J 2475/04* (2013.01); *C08K 2003/265* (2013.01); *C08K 2201/004* (2013.01); *C08K 2201/011* (2013.01)

(58) Field of Classification Search
    CPC ................ C08J 5/08; C08J 2377/00–12; C08J 2477/00–12; C08J 2323/12; C08J 2363/00–10; C08J 5/042; C09D 163/00–10; C09J 163/00–10
    See application file for complete search history.

(56) References Cited

U.S. PATENT DOCUMENTS

| | | | |
|---|---|---|---|
| 4,283,322 | A | 8/1981 | Temple |
| 4,495,245 | A | 1/1985 | Zunker |
| 5,085,938 | A | 2/1992 | Watkins |
| 5,292,805 | A | 3/1994 | Paschke et al. |
| 5,409,783 | A | 4/1995 | Serizawa et al. |
| 5,430,076 | A | 7/1995 | Matsumoto et al. |
| 5,470,658 | A | 11/1995 | Gasca et al. |
| 6,207,737 | B1 | 3/2001 | Schell et al. |
| 6,794,032 | B2 * | 9/2004 | Borgner ................. C08L 23/10 524/214 |
| 6,984,699 | B2 | 1/2006 | Niino |
| 7,732,047 | B2 | 6/2010 | Kashikar et al. |
| 2007/0092674 | A1 * | 4/2007 | Gutwillig ................ B32B 27/00 428/35.7 |
| 2007/0227646 | A1 * | 10/2007 | Yano .................... B29B 15/122 156/441 |
| 2007/0286999 | A1 * | 12/2007 | Dijt ..................... C09D 129/04 428/292.1 |
| 2007/0296089 | A1 * | 12/2007 | Thomas ................. H01L 24/29 252/512 |
| 2008/0307765 | A1 * | 12/2008 | Kobayashi ............ D02G 3/447 429/529 |
| 2009/0092833 | A1 | 4/2009 | Schmitt et al. |
| 2013/0046045 | A1 | 2/2013 | Krizkova et al. |
| 2013/0053501 | A1 | 2/2013 | Kim et al. |
| 2014/0322504 | A1 * | 10/2014 | Narimatsu ................ B32B 5/26 428/212 |
| 2015/0301247 | A1 | 10/2015 | Taima |
| 2017/0037549 | A1 | 2/2017 | Good et al. |
| 2018/0002500 | A1 * | 1/2018 | Nagai ..................... C08K 5/17 |

FOREIGN PATENT DOCUMENTS

| | | | |
|---|---|---|---|
| EP | 0175484 A2 * | 3/1986 | |
| EP | 0450638 A1 | 10/1991 | |
| EP | 0541799 A1 * | 5/1993 | |
| GB | 2225585 A | 6/1990 | |
| JP | 6038743 A | 2/1985 | |
| JP | 05186248 A | 7/1993 | |
| JP | 07232324 A | 9/1995 | |
| JP | 09227172 A | 9/1997 | |
| JP | 2000136311 A | 5/2000 | |
| JP | 2009114435 A | 5/2009 | |
| JP | 2013194338 A | 9/2013 | |
| JP | 2014091753 A | 5/2014 | |
| JP | 2015081262 A | 4/2015 | |
| JP | 2016032929 A * | 3/2016 | |
| WO | 9944959 A1 | 9/1999 | |
| WO | 2012146272 A1 | 11/2012 | |
| WO | WO-2016114352 A1 * | 7/2016 | ............. C08J 5/042 |

OTHER PUBLICATIONS

International Preliminary Report on Patentability for International Application No. PCT/US2018/042677, dated Feb. 11, 2020, 9 pages.

International Search Report and Written Opinion for International Application PCT/US2018/042677, dated Oct. 10, 2018, 13 pages.

Chinese Office Action for Chinese Application No. 201880065147.5, dated May 7, 2022 with partial English language translation, 13 pages.

Japanese Notice of Reasons for Refusal for Japanese Application No. 2020-530417, dated Apr. 11, 2022 with translation, 6 pages.

Japanese Notification of Reason for Refusal for Japanese Application No. 2020-530417, dated Dec. 20, 2022 with translation, 6 pages.

Japanese Decision of Refusal for Japanese Application No. 2020-530417, dated Jul. 11, 2023 with translation, 6 pages.

\* cited by examiner

POLYVINYL ALCOHOL-SIZED FILLERS FOR REINFORCING PLASTICS

CROSS-REFERENCE TO RELATED APPLICATION

This is the U.S. National Phase application of International Application No. PCT/US2018/042677, filed Jul 18, 2018, which claims priority to U.S. Provisional Application No. 62/541,834, filed Aug. 7, 2017, the disclosures of each of these applications being incorporated herein by reference in their entireties for all purposes.

FIELD OF THE INVENTION

The present disclosure relates generally to sized reinforcing fillers comprising a filler and a sizing agent disposed on at least a portion of the filler, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. The present disclosure also relates generally to polymer composites reinforced with at least one sized reinforcing filler, wherein the at least one sized filler includes a filler and a sizing agent as disclosed hereinabove, wherein the reinforcing filler can be a fiber including a continuous fiber, a milled fiber, or a chopped fiber; a particle; or any combination thereof, as well as articles, molded components, and products including such polymers composites.

BACKGROUND OF THE INVENTION

Sizing compositions, when applied to a reinforcing filler, such as a reinforcing fiber or a reinforcing particle, are intended to improve mechanical properties in plastic composites. As such, there exists a continuing need for improved sized fillers useful to reinforce polymer resins.

SUMMARY OF THE INVENTION

Glass fibers are the predominant reinforcement for plastics. Other fibers, such as, e.g., carbon, basalt, quartz, alumina, silicon carbide, nylon, polyester, polypropylene, aramid, acrylic, etc., can also be used in such capacities. Many natural fibers, such as, e.g., hemp, jute, etc., can be used for the manufacture of "green" reinforced plastic composites. However, regardless of the type of fiber used as reinforcement, sizing or binder on the fiber is generally required to protect it during the manufacturing process and to enhance bonding between the fiber and the plastic resin.

Two major categories of matrix resin can be employed: thermoset resins and thermoplastic resins. Polyvinyl acetate, epoxy, polyester, phenolic, phenoxy, or polyurethane dispersions may be used as sizing for fibers used to reinforce thermoset resins. For sizing fibers used to reinforce thermoplastics, polyurethane, epoxy, phenoxy, polypropylene, and acrylic dispersions, among other chemistries, can be used. Nylon and thermoplastic polyester resins form the majority of thermoplastic composites. Polyurethane can be used to size fibers for reinforcement of nylon resins, while epoxy size can be used to size fiber reinforcement of thermoplastic polyesters.

Formulae for sizing reinforcing fibers (e.g., E-glass and other types of common fiber glass) may consist of three general categories of components: (1) coupling agents (e.g., chromium (III) methacrylate (available as Volan® from Zaclon LLC), silane, titanate, etc.), (2) film formers (e.g., polyvinyl acetate, epoxy, polyester, polyurethane, etc.), and (3) processing aids (e.g., lubricants, wetting agents, neutralizing agents, antistatic agents, antioxidants, nucleating agents, crosslinkers, and any combination thereof). From 50% to 90% of the size formula may be composed of film formers, which play a vital role in protecting the fibers from abrasion and bridging the fiber and resin.

Polyolefin resins (e.g., polyethylene and polypropylene, etc.) may require different sizes than those used in nylon and thermoplastic polyester composites in order to bond the fiber and resin. Due to the non-polar nature of polyolefin resins, it may be difficult to achieve the same degree of affinity or reactivity using polyurethane or epoxy dispersions as film-formers compared to that observed when used with nylon and polyester resins. Thus, polyethylene or polypropylene dispersions may be selected as the size for use on fibers for reinforcement of polyolefins, with acid- or maleic anhydride-grafted polyethylene or polypropylene dispersions being preferred. These polyethylene and polypropylene dispersions can provide for some bonding between the fibers and polyolefin resin.

An aspect of the present invention provides a sizing composition that, when applied to a reinforcing filler, such as a reinforcing fiber or a reinforcing particle, results in a sized reinforcing filler having good mechanical properties in plastic composites. In particular, reinforcing fillers sized with such a composition will exhibit superior mechanical properties when used in polyolefin resin-based composites.

Another aspect of the present invention is that the size composition can be in solid form and, thus, much more cost effective to transport compared to aqueous dispersions, which contain 40% to 70% by weight of water.

Another aspect of the present invention is that the size composition can be prepared as an aqueous solution that can tolerate a wide pH range resulting from the addition of other ingredients. This provides for an improvement over polypropylene dispersions used to coat reinforcement fillers that are mostly anionic and high pH in nature and, thus, may be incompatible with acidic ingredients.

Another aspect of the present invention is that the size composition can have a long, useful shelf life compared to most aqueous dispersions, which have very limited shelf lives.

Another aspect of the present invention is that the size composition can be non-hazardous and imposes no environmental effect when disposed of as compared to most aqueous dispersions, the disposal of which incurs expensive disposal fees.

In an additional aspect of the present invention, the size composition can improve the water resistance of the thermoplastic composites, particularly with regard to polyolefin-based composites.

Maleic anhydride-grafted polypropylene dispersions, when used as the film-former (i.e., size) on a reinforcing fiber, will ultimately impart yellowness to the polyolefin composites. Non-yellowing is a critical product requirement in the application of appliances. Thus, it is a further aspect of the present invention that the size composition can improve or, at a minimum, does not negatively affect the color of the thermoplastic composite.

These aspects and others are achieved and the deficiencies of the prior art are overcome by the present invention.

Thus, one embodiment of the present invention is a sized reinforcing filler comprising a filler and a sizing agent disposed on at least a portion of the filler, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer.

In certain embodiments, the filler is in the form of a fiber including a continuous fiber, a milled fiber, or a chopped fiber; a particle; or any combination thereof. In certain embodiments, the filler is a fiber selected from the group consisting of inorganic fibers, organic fibers, natural fibers, and any combination thereof. In certain embodiments, the filler is a fiber selected from the group consisting of carbon fibers, glass fibers, basalt fibers, silica fibers, quartz fibers, alumina fibers, steel fibers, silicon carbide fibers, nylon fibers, polyester fibers, polyethylene fibers, polypropylene fibers, aramid fibers, acrylic fibers, polyphenylene sulfide fibers, hemp fibers, jute fibers, kenaf fibers, and any combination thereof. In an embodiment, the filler is a nanofiber. In another embodiment, the filler is a plant-based natural fiber. In certain other embodiments, the fiber is a glass fiber. In certain of those embodiments, the glass fiber is made from glass having a grade selected from the group consisting of C, D, E, modified E, R, and S. In certain other embodiments, the fiber is a carbon fiber. In certain of those embodiments, the carbon fiber is selected from the group consisting of low modulus carbon fibers, standard modulus carbon fibers, intermediate modulus carbon fibers, high modulus carbon fibers, and super-high modulus carbon fibers. In certain embodiments, the filler is a particle selected from the group consisting of pigments and solid additives. In certain of those embodiments, the particle is selected from the group consisting of talc, mica, clay, nanoclay, calcium carbonate, aluminum hydroxide, titanium oxides, and silica.

In certain embodiments, the sizing agent comprises a polyvinyl alcohol. In certain of those embodiments, the polyvinyl alcohol is a partially hydrolyzed polyvinyl alcohol, an intermediately hydrolyzed polyvinyl alcohol, a fully hydrolyzed polyvinyl alcohol, or a super-fully hydrolyzed polyvinyl alcohol. In certain further embodiments, the sizing agent further comprises at least one additional film former. In certain of those embodiments, the at least one additional film former is selected from the group consisting of polypropylene dispersions, polyurethane dispersions, epoxy dispersions, polyester dispersions, polyvinyl acetate dispersions, phenoxy solutions, nylon dispersions, and any combination thereof. In certain of those embodiments, the at least one additional film former is present in the sizing agent in an amount of up to 50% by weight, based on the total weight of the sizing agent.

In certain embodiments, the sized reinforcing filler further comprises at least one coupling agent and/or at least one processing aid. In certain of those embodiments, the at least one coupling agent is selected from the group consisting of chromium (III) methacrylate (available as Volan® from Zaclon LLC), silane, titanate, and any combination thereof and the at least one processing aid is selected from the group consisting of lubricants, wetting agents, neutralizing agents, antistatic agents, antioxidants, nucleating agents, crosslinkers, and any combination thereof. In an embodiment, the at least one coupling agent is selected from the group consisting of acids, aldehydes, acid-grafted polyolefins, and anhydride-grafted polyolefins. In certain embodiments, the sized reinforcing filler further comprises a cationic lubricant and an anti-static agent.

In certain embodiments of the sized reinforcing filler, the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer size crosslinks with the at least one coupling agent to form a crosslinked sizing agent.

In an embodiment, the at least one coupling agent can be an anhydride-grafted polyolefin and the crosslinked sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer size crosslinked with the anhydride-grafted polyolefin.

In certain embodiments, the sized reinforcing filler is a chopped, milled or continuous fiber in the form of a spool, tow, roving, or mat. In certain other embodiments, the sized reinforcing filler is a chopped fiber. In certain of those embodiments, the chopped fiber is wet, the polyvinyl alcohol is present in an amount in the range of from 0.5 to 10% by weight, based on the total weight of the wet sized chopped fiber and the length of the chopped fiber is in the range of from 0.1 to 6.0 inches. In certain other of those embodiments, the chopped fiber is dry, the polyvinyl alcohol is present in an amount in the range of from 0.1 to 20% by weight, based on the total weight of the dry sized chopped fiber and the length of the chopped fiber is in the range of from 0.1 to 6.0 inches.

Another embodiment of the present invention is a polymer composite comprising (a) a thermoset (co)polymer and/or a thermoplastic (co)polymer, and alloys and blends thereof; and (b) at least one sized reinforcing filler according to various embodiments of the present invention, as disclosed hereinabove. In certain embodiments, the reinforcing filler is in the form of a fiber including a continuous fiber, a milled fiber, or a chopped fiber; a particle; or any combination thereof. In certain embodiments, the fiber is selected from the group consisting of inorganic fibers, organic fibers, natural fibers, and any combination thereof. In certain embodiments, the filler is a fiber selected from the group consisting of carbon fibers, glass fibers, basalt fibers, silica fibers, quartz fibers, alumina fibers, steel fibers, silicon carbide fibers, nylon fibers, polyester fibers, polyethylene fibers, polypropylene fibers, aramid fibers, acrylic fibers, polyphenylene sulfide fibers, hemp fibers, jute fibers, kenaf fibers, and any combination thereof. In certain other embodiments, the filler is a particle selected from the group consisting of pigments and solid additives. In certain of those embodiments, the particle is selected from the group consisting of talc, mica, clay, nanoclay, calcium carbonate, aluminum hydroxide, titanium oxides, and silica.

In certain embodiments, the polymer composite includes a thermoset (co)polymer and/or a thermoplastic (co)polymer, including alloys and blends. In certain of those embodiments, the thermoset (co)polymer is selected from the group consisting of unsaturated polyesters, epoxy resins, vinyl ester resins, phenolic resins, thermoset polyurethanes, polyimides, bismaleimide resins, benzoxazine resins, silicone resins, and any combination, copolymer, and/or derivative thereof. In certain other of those embodiments, the thermoplastic (co)polymer is selected from the group consisting of polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polycyclohexylenedimethylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, polyaryletherketones, liquid crystal polymers, and any combination, alloy, blend, copolymer, and/or derivative thereof. In certain embodiments, the thermoplastic (co)polymer is a polyolefin is selected from the group consisting of polyethylenes, polypropylenes, and any derivative, copolymer, and/or combination thereof. In certain embodiments, the thermoplastic polymer is a mixture of at least one polyolefin and at least one polyamide. In certain of those embodiments, the polyolefin content of the mixture is greater than 50% by weight, based on the total weight of the mixture. In certain of those embodiments, the at least one polyolefin is a polypropylene.

In certain embodiments, the filler of the polymer composite is a continuous fiber in the form of a roving and the composite is a long fiber thermoplastic composite. In certain other embodiments, the filler of the polymer composite is a chopped fiber. In certain of those embodiments, the length of the chopped fiber is in the range of from 0.1 to 6.0 inches. In certain other of those embodiments, the length of the chopped fiber is in the range of from 0.1 to 6.0 inches. In certain embodiments, the content of the sized reinforcing filler in the polymer composite is in the range of from 1 to 80% by weight, based on the total weight of the polymer composite.

In certain embodiments, the polymer composite further comprises at least one coupling agent. In certain of those embodiments, the at least one coupling agent is selected from the group consisting of, acids, aldehydes, acid-grafted polyolefins and anhydride-grafted polyolefins. In certain of those embodiments, the at least one coupling agent is selected from the group consisting of (poly)acrylic acid, amic acid, fumaric acid, dicarboxylic acid, oxalic acid, malonic acid, citric acid, maleic acid, glutaraldehyde, acetaldehyde, butyraldehyde, formaldehyde, acrylic acid-grafted polypropylenes, maleic anhydride-grafted polypropylenes, itaconic anhydride-grafted polypropylenes, succinic anhydride-grafted polypropylenes, and any combination thereof. In an embodiment, the at least one coupling agent is a maleic anhydride-grafted polypropylene.

In certain embodiments, the polymer composite further comprises a filler sized with a crosslinked sizing agent, wherein the crosslinked sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer size crosslinked with the at least one coupling agent. Any suitable coupling agent as disclosed hereinabove can be used. In an embodiment, the at least one coupling agent is an anhydride-grafted polyolefin and the crosslinked sizing agent comprises at least one of a polyvinyl alcohol, an ethylene/vinyl alcohol copolymer, a silane-grafted polyvinyl alcohol and a silane-grafted ethylene/vinyl alcohol copolymer size crosslinked with the anhydride-grafted polyolefin.

In an embodiment of the polymer composite, the sizing agent comprises a polyvinyl alcohol. In another embodiment, the polyvinyl alcohol is a partially hydrolyzed polyvinyl alcohol, an intermediately hydrolyzed polyvinyl alcohol, a fully hydrolyzed polyvinyl alcohol, or a super-fully hydrolyzed polyvinyl alcohol.

Yet another embodiment of the present invention is an article comprising the polymer composite according to the present invention, as disclosed hereinabove.

In certain embodiments, the article is selected from the group consisting of short-fiber compounds, unidirectional reinforced thermoplastic tapes, randomized continuous mats, long chopped mats, pelletized long compounds, and extruded long logs. In certain other embodiments, a component comprising the article is configured for use in one or more of automotive, appliance, and electronic assembly. In certain of those embodiments, the article is selected from the group consisting of automotive door liners, front end modules, air intake manifolds, bumper beams, motorbike boots, car cooling fan blades, air conditioner fan blades, pump housings, automotive body panels, dashboard carriers, multi-wing impellers, lift gates, truck liners, automotive vertical panels, instrument panel carriers, door panel structures, seating structures, under hood components, gasoline doors, mirror housings, front end carriers, dash board carriers, door base plates, underbody covers, front undertrays, washing machine tubs, airbag housings, business machines, electronics packaging, and hard disk drives.

Yet another embodiment of the present invention is a molded component formed from the polymer composite according to the present invention.

Yet another embodiment of the present invention is a product including the molded component according to the present invention.

In another embodiment, there is a method of making a polymer composite including the steps of contacting a sizing agent with at least a portion of a reinforcing filler to form a sized reinforcing filler according to any one of the embodiments disclosed hereinabove, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. The method also comprises compounding the sized reinforcing filler with a polymer, wherein the polymer comprises a thermoset (co)polymer, a thermoplastic (co)polymer, and alloys and blends thereof.

In another embodiment, the step of compounding the sized reinforcing filler with a polymer further comprises compounding with at least one coupling agent selected from the group consisting of acids, aldehydes, acid-grafted polyolefins, and anhydride-grafted polyolefins, wherein the at least one coupling agent crosslinks with the sizing agent, thereby forming a crosslinked sizing agent disposed over at least a portion of the sized reinforcing filler.

In yet another embodiment, the method further comprises adding up to 10% by weight of sizing agent to the polymer before the step of compounding the sized reinforcing filler with the polymer.

of a resin matrix reinforced with untreated calcium carbonate (Q3 only); polyvinyl alcohol-sized calcium carbonate (Q3+PVOH size); and polypropylene-sized calcium carbonate (Q3+PP size).

Figure 4:
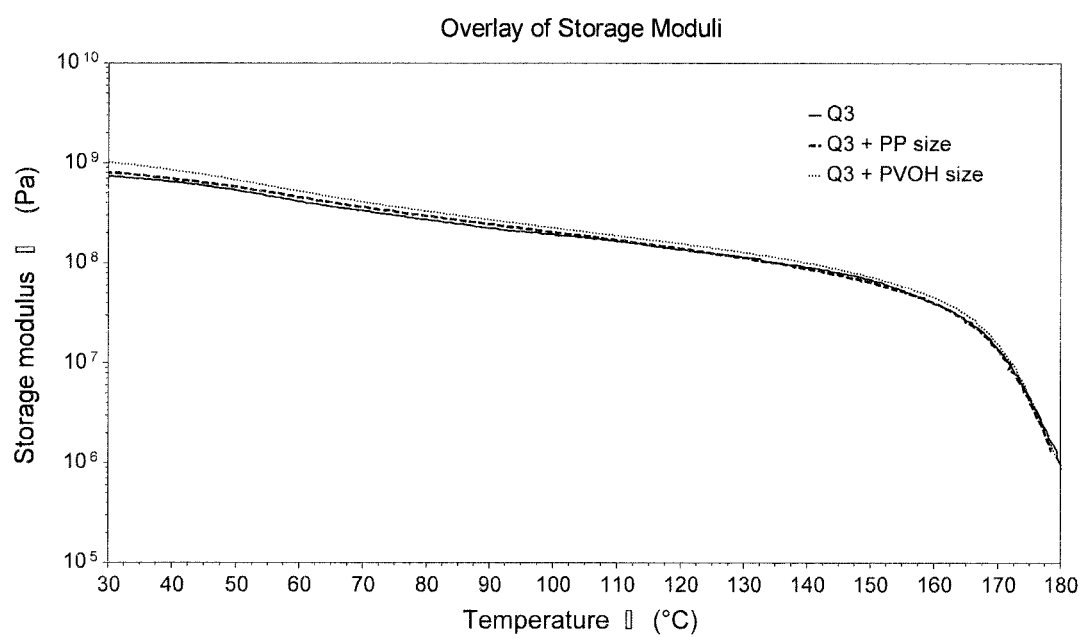
FIG. 4 graphically depicts a comparison of the storage modulus as a function of temperature from 30° C. to 180° C.
Figure 5:
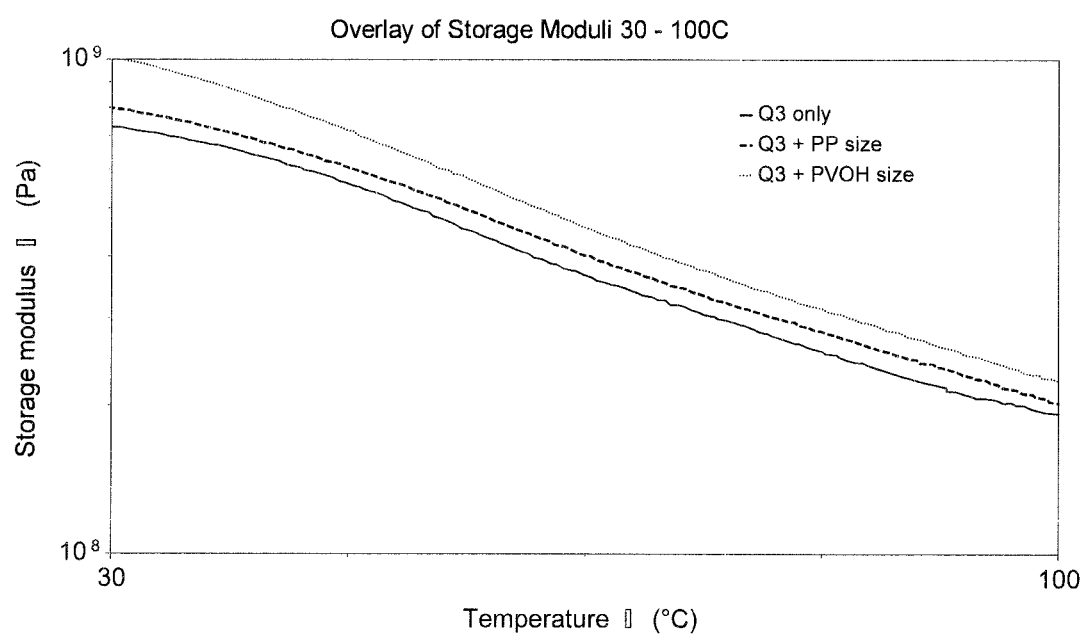

FIG. 5 is a portion of FIG. 4 in the temperature range of 30° C. to 100° C.

DETAILED DESCRIPTION OF THE INVENTION

Fibers often require treatment, commonly referred to as spin finish, binder, or size, before use. For textile fibers, the purpose of spin finish is to provide surface lubricity, anti-static, dye affinity, wetting or anti-wetting, and abrasion resistance. If the textile fibers are used for plastic reinforcement, the spin finish or binder may contain a resin dispersion to enhance its compatibility to the plastic to be reinforced. For inorganic fibers used for plastic reinforcement, binder or size provides surface lubricity, anti-static, wetting, anti-oxidation, abrasion resistance, resin bonding, and compatibility. This principle also applies to plant-based natural fibers.

In one aspect of the present invention, the present disclosure provides for novel, sized reinforcing fillers comprising a filler and a sizing agent. In certain embodiments, the reinforcing filler according to the present invention is in the form of a fiber, a particle, or any combination thereof. As used herein, the terms "fiber" and "fibers" includes, continuous fibers, chopped fibers, milled fibers, nanotube(s), microfiber(s), and nanofiber(s). As used herein, the chopped fibers can be made from chopping virgin or recycled tows. The chopped fibers can have any suitable size; for example, can have length from 1 to 12 mm. As used herein, the milled fibers can be made from production waste, which can be in tow form, loosened tows, or even chopped. The milled fibers can be thermally desized (burnt off) prior to use. The milled fibers can have any suitable size, for example they can be grinded to 50 to 200 microns. As used herein, the terms "particle" and "particles" includes microparticle(s) and nanoparticle(s).

The fibers that may be used to form the sized reinforcing fillers according to the present invention can be any fiber known in the art for reinforcing composites, such as polymer composites. Examples of such fibers include, but are not limited to, carbon fibers, glass fibers, basalt fibers, silica fibers, quartz fibers, alumina fibers, and silicon carbide fibers. In certain embodiments, the fibers that may be used to form the sized reinforcing fillers according to the present invention are selected from the group consisting of inorganic fibers, organic fibers, natural fibers, and any combination thereof. Exemplary fibers include, but are not limited to, carbon fibers, glass fibers, basalt fibers, silica fibers, quartz fibers, alumina fibers, steel fibers, silicon carbide fibers, nylon fibers, polyester fibers, polyethylene fibers, polypropylene fibers, aramid fibers, acrylic fibers, polyphenylene sulfide fibers, hemp fibers, jute fibers, kenaf fibers, and any combination thereof. In certain embodiments, the fiber is a glass fiber or a carbon fiber. The glass and carbon fibers can be of any class, type, or grade known in the art. Examples of grades of glass fiber that may be used to form the sized reinforcing filler according to the present invention include, but are not limited to, grade C, grade D, grade E (most common), modified grade E (i.e., boron or fluorine-free), grade R, and grade S. Examples of grades of carbon fiber that may be used to form the sized reinforcing filler according to the present invention include, but are not limited to, low modulus carbon fibers, standard modulus carbon fibers, intermediate modulus carbon fibers, high modulus carbon fibers, and super-high modulus carbon fibers. The carbon fiber that may be used to form the sized reinforcing filler according to the present invention may be derived from either polyacrylonitrile (PAN) or pitch. In certain embodiments, the particles that may be used to form the sized reinforcing fillers according to the present invention are selected from the group consisting of inorganic particles.

The particles that may be used to form the sized reinforcing filler according to the present invention can be any particle known in the art for reinforcing composites, such as polymer composites, such as pigments and other solid additives. Examples of such particles include, but are not limited to, talc, mica, clay (including nanoclay), calcium carbonate, aluminum hydroxide, titanium oxides, and silica.

In another aspect of the present invention, the present disclosure provides for novel polymer composites comprising a thermoset (co)polymer and/or a thermoplastic (co)polymer, and alloys and blends thereof and at least one sized reinforcing filler, wherein the at least one sized reinforcing filler includes a filler and a sizing agent disposed on at least a portion of the filler. The sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. In certain embodiments, the polymer composites according to the present invention can have a sized reinforcing filler content in the range of from 1 to 80% or preferred 3 to 70%, or most preferred 5 to 60% by weight, based on the total weight of the polymer composite.

The polymer composites according to the present invention may be formed from and based on any thermoset (co)polymer and/or thermoplastic (co)polymer known in the art. Examples of such thermoset (co)polymers included, but are not limited to, unsaturated polyesters, epoxy resins, vinyl ester resins, phenolic resins, thermoset polyurethanes, polyimides, bismaleimide resins, benzoxazine resins, and silicone resins. Examples of such thermoplastic (co)polymers include, but are not limited to, polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends. In certain embodiments, the polymer composite according to the present invention may be formed from and based on a mixture of at least one polyolefin and at least one polyamide. In certain embodiments, the polyolefin content of this mixture is greater than 50% by weight, based on the total weight of the mixture. In certain other embodiments, the at least one polyolefin is a polypropylene.

The sized reinforcing filler of the polymer composite according to the present invention can be prepared from any filler, including any fiber (including including a continuous fiber, a milled fiber, or a chopped fiber), a particle, or any combination thereof, known in the art for reinforcing composites, such as polymer composites. Examples of such fibers include, but are not limited to, inorganic fibers, organic fibers, natural fibers and any combination thereof. Examples of such fibers include, but are not limited to, carbon fibers, glass fibers, basalt fibers, silica fibers, quartz fibers, alumina fibers, steel fibers, silicon carbide fibers, nylon fibers, polyester fibers, polypropylene fibers, aramid fibers, acrylic fibers, polyphenylene sulfide fibers, hemp fibers, jute fibers, kenaf fibers, and any combination thereof. Examples of such particles include, but are not limited to, talc, calcium carbonate, aluminum hydroxide, titanium oxides, and silica. In certain embodiments, the fiber used to prepare the sized reinforcing filler of the polymer composite according to the present invention is a glass fiber or a carbon fiber. These glass and carbon fibers can be of any class, type, or grade known in the art, examples of which are as described above.

The sizing agent of the sized reinforcing fillers according to the present invention comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. Polyvinyl alcohols are categorized into four classes based on their degree of hydrolyzation: partially, intermediate, fully, and super fully. As such, the polyvinyl alcohols or ethylene/vinyl alcohol copolymers used according to the present invention may be partially hydrolyzed, intermediately hydrolyzed, fully hydrolyzed, or super-fully hydrolyzed. Within each class, there are number of grades of various viscosities. Commercially known brands are POVAL® and ELVA-NOL® by Kuraray and Selvol® by Sekisui. All of them can be used according to the present invention as a sizing agent. Partially hydrolyzed polyvinyl alcohols are easier to prepare into an aqueous solution at room temperature, while fully and super-fully hydrolyzed polyvinyl alcohols require hot water to dissolve.

In an embodiment, the polyvinyl alcohol comprises a silane-grafted polyvinyl alcohol. In another embodiment, the ethylene/vinyl alcohol copolymer comprises a silane-grafted ethylene/vinyl alcohol copolymer.

The sizing industry is very small and there are only a handful companies in the world that make useful dispersions. Conventional dispersions often contain from 30% to 70% by weight of water, making it costly to ship such dispersions across continents. In contrast, polyvinyl alcohols are mass produced in every corner of the world and costs less than polyurethane and polypropylene dispersions. But, unlike these dispersions, polyvinyl alcohols are sold as 100% solids. As such, polyvinyl alcohols have the advantage of being less costly to transport compared to conventional dispersions.

In certain embodiments, the sized reinforcing filler further comprises a sizing agent comprising at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer size crosslinked with the at least one coupling agent, to form a crosslinked sizing agent. In an embodiment, the at least one coupling agent can be an anhydride-grafted polyolefin and the crosslinked sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer size crosslinked with the anhydride-grafted polyolefin.

In some applications, lighter colored filler-reinforced thermoplastic composites are highly desirable. With polypropylene dispersions, the polypropylene is grafted with maleic anhydride and neutralized with amine. With polyurethane dispersions, nitrogen is in the resin backbone. As a result of this presence of nitrogen, both dispersions impart yellowness to the resulting composite. In contrast, polyvinyl alcohol is colorless and thermoplastic composites reinforced with polyvinyl alcohol-sized reinforcing fillers have a much lower yellow index.

Most polyurethane and polypropylene dispersions are anionic and have pH values above 7. Many other types of dispersions useful for fiber sizing have the same properties. Unfortunately, some silanes and some of the more powerful lubricants and anti-static agents for fiberglass sizing require the sizing mixture be acidic. In contrast, polyvinyl alcohol does not impact the pH of the mixture. This provides complete freedom in sizing formulation. Cationic lubricants provide the best lubricity to glass fiber. To be able to use cationic lubricants in the sizing formulation is very important in making continuous spools, tows, and rovings, and particularly for tows for long fiber compounding in thermoplastic composite applications.

Conventional dispersions for sizing are hazardous. The cost is high to dispose of sizing waste. In contrast, polyvinyl alcohol is non-hazardous and, thus, the cost for disposal is much lower. Polyvinyl alcohol pellets meet all government regulations. Thus, a composite made from polyvinyl alcohol-sized reinforcing filler has a better chance to comply with government regulations.

A sizing formula for sizing reinforcing fillers for plastic reinforcement typically consists of three components: (1) a coupling agent, (2) a film former, and (3) a processing aid (i.e., lubricant, wetting agent, neutralizing agent, antistatic agent, antioxidant, nucleating agent, crosslinker, and any combination thereof). The sizing formula can contain up to 90% of a coupling agent; up to 99%, or up to 90%, or from 50% to 90% of a film former; and up to 99% additives.

All commodity and engineering plastics can be reinforced by various reinforcing fillers. Conventional film formers are typically supplied as water-based dispersions of organic resins. For thermoset resin-based composites, unsaturated polyester, epoxy, vinyl ester, phenolic, and thermoset polyurethane are the most commonly used resins. Other exotic resins, such as polyimide, bismaleimide (BMI), benzoxazine, and silicone, are also used, but have very small market shares due to their high cost. Film-formers commonly used to size the reinforcing fillers for such composites include polyvinyl acetate, vinyl acetate-ethylene, vinyl ester, epoxy, phenoxy, unsaturated polyester, saturated polyester, and polyurethane. For thermoplastic resin, polyolefins (e.g., polyethylene (PE) and polypropylene (PP)), acrylonitrile butadiene styrene (ABS), polyvinyl chloride (PVC), and polystyrene (PS) dominate the volume of resin consumption. Among the reinforced thermoplastic composites, nylon has the largest percentage of volume, followed by thermoplastic polyester. For sizing reinforcing fillers to reinforce nylon resins, film formers conventionally used are polyurethane dispersions (PUD), polyamide dispersions, epoxy dispersions, acrylics, and maleic anhydride-grafted ethylene. For sizing for fillers to reinforce thermoplastic polyester resins, film formers conventionally used are epoxy dispersions, polyurethane dispersions, and polyester dispersions.

Thus, the sizing agent used according to the present invention may further comprise at least one additional film former. Examples of such film formers include, but are not limited to, polypropylene dispersions, polyurethane dispersions, epoxy dispersions, polyester dispersions, polyvinyl acetate dispersions, phenoxy dispersions, nylon dispersions. The at least one additional film former may be present in the sizing agent in any amount. In certain embodiments, the at least one additional film former may be present in the sizing agent in an amount of up to 50% by weight, relative to the total weight of the sizing agent present on the sized filler according to the present invention.

Since nylon and polyester comprise the largest share of thermoplastic composites, more chopped fibers with polyurethane size or epoxy size are available on the market than any other. For sizing glass and other fibers, silane coupling agent is used to enhance the bonding of fibers to the polypropylene resin. It complements the PUD and epoxy film-former. For sizing carbon fibers, the film-former carries a significant amount of stress transfer at the interface between carbon fibers and the polypropylene resin. Over 80% of carbon fibers are used for thermoset resin-based composites. These fibers contain epoxy sizes. Thus, for the reason of convenience, polypropylene compounders use fibers with epoxy or polyurethane sizes.

The suppliers of polyethylene and polypropylene dispersions target these products for coating applications. For fibers for polyolefin reinforcement, these dispersions are found to be very useful. More specifically, acid-grafted polyethylene or polypropylene and maleic anhydride-grafted polyethylene or polypropylene are more suitable for the sizing formula. One supplier is Michelman (Cincinnati, OH), which markets a large portfolio of polyolefin dispersions: FGLASS™ X35, X48, X70 and X90, Michem® Emulsion 11226, 28640, 29730, 91735, and 93135M, Michem® Prime 2960, 4983R, and 5931, Hydrosize® PE1-01, PP2-01, PP235, PP2114, PP247, PP943.

The sized reinforcing fillers according to the present invention may further comprise at least one coupling agent and/or at least one processing aid. Examples of such coupling agents include, but are not limited to, chromium (III) methacrylate (available as Volan® from Zaclon LLC), silane, and titanate. Examples of such processing aids include, but are not limited to, lubricants, wetting agents, neutralizing agents, antistatic agents, antioxidants, nucleating agents, crosslinkers, and any combination thereof. In certain embodiments, the sized reinforcing fillers according to the present invention may further comprise a cationic lubricant and an anti-static agent.

Polyolefin resins, especially polypropylene, make up a large share of reinforced composites. The advantage of using polypropylene is its low cost, low density, and easy processing. However, polyolefin resins have no functionality for further reaction. As such, in forming composites from polyolefin resins, compounders use coupling agents to bond the polyolefin to the reinforcing fibers. Thus, the polymer composites according to the present invention may further comprise at least one coupling agent present in an amount of up to 10% or from 1.5% to 6%, or from 1.5% to 4.5% by weight based on the total weight of the polyolefin and the coupling agent. Such coupling agents can include acids, aldehydes, acid-grafted polyolefins, and anhydride-grafted polyolefins. Examples of such coupling agents include, but are not limited to, (poly)acrylic acid, amic acid, fumaric acid, dicarboxylic acid, oxalic acid, malonic acid, citric acid, maleic acid, glutaraldehyde, acetaldehyde, butyraldehyde, formaldehyde, acrylic acid-grafted polypropylenes, maleic anhydride-grafted polypropylenes, itaconic anhydride-grafted polypropylenes, and succinic anhydride-grafted polypropylenes.

Many coupling agents are available commercially. One brand is Polybond®, supplied by Addivant. An example of an acid-grafted high density polyethylene (HDPE) includes Polybond® 1009. Examples of maleic anhydride-grafted HDPE include Polybond® 3009, Polybond® 3029, and Polybond® 3039. Examples of acid-grafted polypropylene include Polybond® 1001, Polybond® 1002, and Polybond® 1103. Examples of maleic anhydride-grafted polypropylene include Polybond® 3000, Polybond® 3002, Polybond® 3150, and Polybond® 3200. Examples of an acid grafted low-low density polyethylene (LLDPE) include Polybond® 3149.

Maleic anhydride-grafted polypropylene dispersion-sized fibers for reinforcing polypropylene provides superior mechanical properties than polyurethane or epoxy sized fibers. Representative U.S. Patent Nos. disclosing use of such polypropylene dispersions as fiber sizing include U.S. Pat. Nos. 4,283,322, 5,430,076, 5,470,658, 6,207,737, 6,984,699, and 7,732,047, which are hereby incorporated by reference in their entireties.

In certain embodiments, the polymer composite as disclosed hereinabove further comprises a filler sized with a crosslinked sizing agent including polyvinyl alcohol and/or ethylene/vinyl alcohol copolymer size crosslinked with the at least one coupling agent. Any suitable coupling agent as disclosed hereinabove can be used. In an embodiment, the at least one coupling agent is an anhydride-grafted polyolefin and the crosslinked sizing agent includes polyvinyl alcohol and/or ethylene/vinyl alcohol copolymer size crosslinked with the anhydride-grafted polyolefin.

Polyvinyl alcohol is widely used in paper sizing and as a wrap size for weaving operation. It provides high film strength and excellent abrasion resistance. It is also re-wettable. This is the reason it is used as wrap size because it can be scoured off. In nonwoven mat, polyvinyl alcohol is used as a dispersion aid. It is formulated into size on the fiber and also into white water during wet-laid operation.

In addition to good initial mechanical properties, all polymer composites must have good water resistance. In many critical applications, this is the primary requirement. Water absorption occurs at the bulk state of the resin and at the interface between reinforcing filler and the resin. Water resistance of the interfacial bonding plays a vital role of the water resistance of the composite. Glass fiber-reinforced nylon is used widely in radiator end caps and air intake manifolds in the automotive industry. In fact, this is the single largest application of thermoplastic composites. In this application, the part is in constant contact with a hot mixture of antifreeze and water. Nylon is hygroscopic. So, the water resistance of the nylon composite derives solely from interfacial bonding.

Figure 1:
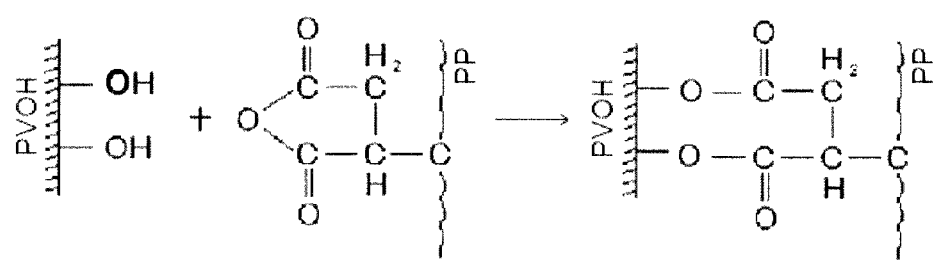
FIG. 1 schematically depicts the crosslinking reaction between hydroxyl groups of polyvinyl alcohol and a maleic anhydride moiety of maleic anhydride-grafted polypropylene.

Polyvinyl alcohol is water soluble, re-wettable, and has no water resistance. For this reason, it has never been studied as a permanent, reactive sizing component in sizing formulae for reinforcing fillers. However, when anhydride-grafted polyolefin is used as the coupling agent in the presence of polyvinyl alcohol and/or ethylene/vinyl alcohol copolymer size, crosslinking is observed. Once crosslinked, the polyvinyl alcohol and/or ethylene/vinyl alcohol copolymer forms a water-insoluble, semi-crystalline structure. The crosslinking reaction scheme is illustrated in FIG. 1. Once the polyvinyl alcohol and/or ethylene/vinyl alcohol copolymer size on the reinforcing filler surface crosslinks to the anhydride functionality on the polyolefin, the interfacial bonding makes the composite strong and tough. The interface also becomes insoluble and the composite has outstanding water resistance.

The sized reinforcing fillers according to the present invention can be manufactured by any method known in the art. With regard to the manufacture of sized fibers or particles according to present invention, in one embodiment polyvinyl alcohol is dissolved in water at a concentration in the range of from 0.5% to 30%, or from 1% to 10%, or from 2% to 8% by weight, based on the total weight of the solution. This solution can be applied to the fiber or particle surface during or after the fiber forming process or after the particles are formed. In the case of fibers, once the continuous fiber is coated with polyvinyl alcohol, it can be wound into spools, bobbins, tows, or rovings. The continuous fiber can be chopped wet and used in wet stage. An example of a slurry process to form a discontinuous polypropylene mat is disclosed in US 2017/0037549 A1 to Good et al., which is incorporated herein by reference in its entirety. In this process, sized wet spool is chopped into a forming tank, which also contains polypropylene dispersion. The fibers and resins form a random mat on the moving screen. Water is drained and the mat is dried. The sized spool can also be dried and used in long fiber thermoplastic composites ("LFT"). LFT can be in the form of a unidirectional tape in which continuous spools are impregnated with resin and wound into tapes for subsequent stacking into parts. LFT can also be a process that melt impregnates continuous sized spool into long strands. The strands are then pelletized into long pellets, typically ¼", ½ ", or 1" in length for injection molding into parts. Another variation of the LFT process is feeding sized continuous fiber into an extruder. The fibers are broken by the screws in the extruder and the extrudate contains long discontinuous fibers. This is commonly known as D-LFT process. As such, continuous, sized fibers according to the present invention can be in the form of a spool, tow, roving, or mat. In certain embodiments, the polymer composite according to the present invention is a long fiber, thermoplastic composite comprising continuous, sized fibers according to the present invention.

The dried sized spool can be chopped into short fibers and collected into sellable packaging. Typically chopped lengths are 0.04", 0.1", ⅟₁₆", ⅛", ³⁄₁₆", ¼", ½", 1", 2", 4" or longer. The polyvinyl alcohol can also be applied to the fiber surface during the fiber forming step and subsequently chopped into short fibers online. The short fibers are dried and packaged into sellable products. The dried sized spool can also be over-coated with polyvinyl alcohol solution and chopped wet. The short fibers are dried and packaged.

The polymer composites according to the present invention can be manufactured according to any method known in the art. In certain embodiments, chopped, sized fibers and/or sized particles according to the present invention can be mixed with thermoplastic resins and formed into reinforced compounds for OEMs to injection mold into parts. Extrusion compounding is the typical process to mix the sized fibers and/or sized particles and resin. Sized fibers and/or sized particles and resin can be pre-weighed to the right proportion, blended, and fed into the feed hopper at the end of the extruder. Sized fibers and/or sized particles and resins can also be fed into the extruder separately at the right proportion. Resin is metered into the resin hopper at the throat of the extruder, typically a twin-screw extruder, and is melted in the next few barrels. Sized fiber and/or sized particles are then metered into the molten resin through a stuffing side feeder. The mixed compound is then extruded through the strand die and pelletized into pellets. Alternatively, a continuous tow or roving can be fed downstream on the extruder.

In one embodiment according to the present invention, polyvinyl alcohol size is applied onto carbon fibers. Solid polyvinyl alcohol pellets are added to water, which can be tap, distilled, or deionized water. The solution is stirred overnight to dissolve polyvinyl alcohol. The solids content of the solution can range from 0.1% to 30%, from 1% to 15%, or from 2% to 8% by weight, based on the total weight of the solution. Unsized, continuous carbon fiber tows pass through a sizing bath containing the polyvinyl alcohol solution and subsequently through a pair of padding rollers to squeeze out excess solution. The wet tows are then chopped into short fibers. The chopped length can range from ⅟₁₆ " to 2", or from ⅛" to 1", or be ¼". The chopped, sized carbon fibers are then dried in a forced air oven at a temperature in the range of from 212° F. to 550° F., from 225° F. to 450° F., or from 250° F. to 400° F. The moisture content of the dried, chopped, sized carbon fibers should be less than 1% or less than 0.2% by weight, based on the total weight of the fiber. The sizing content of wet or dried, chopped, sized carbon fibers can range from 0.1% to 20% by weight, from 0.5% to 10% by weight, or from 1% to 6% by weight.

Polyvinyl alcohol-sized, short carbon fibers according to the present invention can be compounded with engineering plastics. In the case of polypropylene compounding, polypropylene resin such as Pro-fax 6523 available from LyondellBasell is blended with anhydride-grafted polypropylene such as Polybond® 3200, 3100 available from Addivant at various concentrations. The anhydride-grafted polypropylene can be present in an amount of up to 6%, or from 1.5% to 6% or from 1.5% to 4.5% by weight, based on the total weight of the compounding composition comprising polypropylene and anhydride-grafted polypropylene. The compounding is done with a Coperion ZSK 26 mm twin-screw extruder. The test bar is molded from a JSW 85-ton electrical injection molding machine.

In yet another aspect of the present invention, the present disclosure provides for articles, such as molded components, formed from the novel polymer composites according to the present invention, as well as products including such articles. Such articles include short-fiber compounds, unidirectional reinforced thermoplastic tapes, randomized continuous mats, long chopped mats, pelletized long compounds, and extruded long logs. In an embodiment, there is a component comprising the article, as disclosed hereinabove, wherein the component is configured for use in one or more of automotive, appliance, and electronic assembly. Examples of such articles include, but are not limited to, automotive door liners, front end modules, air intake manifolds, bumper beams, motorbike boots, car cooling fan blades, air conditioner fan blades, pump housings, automotive body panels, dashboard carriers, multi-wing impellers, lift gates, truck liners, automotive vertical panels, instrument panel carriers, door panel structures, seating structures, under hood components, gasoline doors, mirror housings, front end carriers, dash board carriers, door base plates, underbody covers, front undertrays, washing machine tubs, airbag housings, business machines, electronics packaging, and hard disk drive.

In another aspect of the present invention, there is a method of making a polymer composite including the steps of contacting a sizing agent with at least a portion of a reinforcing filler to form a sized reinforcing filler according to any one of the embodiments disclosed hereinabove, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer. The method also comprises compounding the sized reinforcing filler with a polymer, wherein the polymer comprises a thermoset (co)polymer, a thermoplastic (co)polymer, and alloys and blends thereof.

In another embodiment, the method further comprises compounding with at least one coupling agent selected from the group consisting of acids, aldehydes, acid-grafted polyolefins, and anhydride-grafted polyolefins, wherein the at least one coupling agent crosslinks with the sizing agent, thereby forming a crosslinked sizing agent disposed over at least a portion of the sized reinforcing filler.

In yet another embodiment, the method further comprises adding up to 10% by weight of sizing agent to the polymer before the step of the step of compounding the sized reinforcing filler with the polymer.

More specifically, the following listing includes particular embodiments of the invention:

1. A sized reinforcing filler comprising a filler and a sizing agent, wherein the sizing agent includes a polyvinyl alcohol and/or an ethylene/vinyl alcohol copolymer.
2. The sized reinforcing filler according to embodiment 1, wherein the filler is in the form of a fiber, a milled fiber, a particle, or any combination thereof.
3. The sized reinforcing filler according to embodiment 1, wherein the filler is a fiber selected from the group consisting of carbon fibers and inorganic fibers.
4. The sized reinforcing filler according to embodiment 1, wherein the filler is a fiber selected from the group consisting of carbon fibers, glass fibers, basalt fibers, silica fibers, quartz fibers, alumina fibers, and silicon carbide fibers.
5. The sized reinforcing filler according to embodiment 4, wherein the fiber is a glass fiber.
6. The sized reinforcing filler according to embodiment 5, wherein the glass fiber is made from glass having a grade selected from the group consisting of C, D, E, modified E, R, and S.
7. The sized reinforcing filler according to embodiment 4, wherein the fiber is a carbon fiber.
8. The sized reinforcing filler according to embodiment 7, wherein the carbon fiber is selected from the group consisting of low modulus carbon fibers, standard modulus carbon fibers, intermediate modulus carbon fibers, high modulus carbon fibers, and super-high modulus carbon fibers.
9. The sized reinforcing filler according to embodiment 2, wherein the filler is a particle selected from the group consisting of pigments and solid additives.
10. The sized reinforcing filler according to embodiment 9, wherein the particle is selected from the group consisting of talc, mica, clay, nanoclay, calcium carbonate, aluminum hydroxide, titanium oxides, and silica.
11. The sized reinforcing filler according to any one of the preceding embodiments, wherein the sizing agent comprises a polyvinyl alcohol.
12. The sized reinforcing filler according to embodiment 11, wherein the polyvinyl alcohol is a partially hydrolyzed polyvinyl alcohol, an intermediately hydrolyzed polyvinyl alcohol, a fully hydrolyzed polyvinyl alcohol, or a super-fully hydrolyzed polyvinyl alcohol.
13. The sized reinforcing filler according to embodiment 11, wherein the sizing agent further comprises at least one additional film former.
14. The sized reinforcing filler according to embodiment 13, wherein the at least additional one film former is selected from the group consisting of polypropylene dispersions, polyurethane dispersions, epoxy dispersions, polyester dispersions, polyvinylacetate dispersions, phenoxy solutions, nylon dispersions, and any combination thereof.
15. The sized reinforcing filler according to embodiment 13 or 14, wherein the at least one additional film former is present in the sizing agent in an amount of up to 50% by weight, based on the total weight of the sizing agent.
16. The sized reinforcing filler of embodiment 11, wherein the filler is a glass fiber.
17. The sized reinforcing filler of embodiment 11, wherein the filler is a carbon fiber.
18. The sized reinforcing filler according to any one of the preceding embodiments, further comprising at least one coupling agent and/or at least one processing aid.
19. The sized reinforcing filler according to embodiment 18, wherein the at least one coupling agent is selected from the group consisting of Volan, silane, titanate, and any combination thereof, and the at least one processing aid is selected from the group consisting of lubricants, antistatic agents, antioxidants, nucleating agents, crosslinkers, and any combination thereof.
20. The sized reinforcing filler according to embodiment 18 or 19, further comprising a cationic lubricant and an anti-static agent.
21. The sized reinforcing filler according to any one of the preceding embodiments, wherein the sized reinforcing filler is a continuous fiber in the form of a spool, tow, roving, fabric, or mat.
22. The sized reinforcing filler according to any one of the preceding embodiments, wherein the sized reinforcing filler is a chopped fiber.
23. The sized reinforcing filler according to embodiment 22, wherein the chopped fiber is wet, the polyvinyl alcohol is present in an amount in the range of from 0.1 to 20% by weight, and the length of the chopped fiber is in the range of from 0.1 to 6.0 inches.
24. The sized reinforcing filler according to embodiment 22, wherein the chopped fiber is dry, the polyvinyl alcohol is present in an amount in the range of from 0.1 to 20% by weight, and the length of the chopped fiber is in the range of from 0.1 to 6.0 inches.
25. A polymer composite comprising at least one sized reinforcing filler according to any one of the preceding embodiments, wherein the at least one sized reinforcing filler includes a filler and a sizing agent, wherein the sizing agent includes a polyvinyl alcohol and/or an ethylene/vinyl alcohol copolymer.
26. The polymer composite according to embodiment 25, wherein the filler is in the form of a fiber or a particle.
27. The polymer composite of embodiment 25, wherein the polymer composite includes a thermoset (co)polymer and/or a thermoplastic (co)polymer, and alloys and blends thereof.
28. The polymer composite according to any of the embodiments 25-27, wherein the thermoset (co)polymer is selected from the group consisting of unsaturated polyesters, epoxy resins, vinyl ester resins, phenolic resins, thermoset polyurethanes, polyimides, bismaleimide resins, benzoxazine resins, silicone resins, and any combination, copolymer, and/or derivative thereof.
29. The polymer composite according to embodiment 28 or 29, wherein the thermoplastic (co)polymer is selected from the group consisting of polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polycyclohexylenedimethylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, polyaryletherketones, liquid crystal polymers, and any combination, alloy, blend, copolymer, and/or derivative thereof.

30. The polymer composite according to any one of the embodiments 25, 26, 27 or 29, wherein the thermoplastic polymer is a polyolefin selected from the group consisting of polyethylenes, polypropylenes, and any derivative, copolymer, and/or combination thereof.

31. The polymer composite according to any one of the embodiments 25, 26, 27 or 29, wherein the thermoplastic polymer is a mixture of at least one polyolefin and at least one polyamide.

32. The polymer composite according to embodiment 31, wherein the polyolefin content of the mixture is greater than 50% by weight, based on the total weight of the mixture.

33. The polymer composite according to embodiment 32, wherein the at least one polyolefin is a polypropylene.

34. The polymer composite according to embodiment 25 or 26, wherein the filler is a fiber selected from the group consisting of inorganic fibers, organic fibers, natural fibers, and any combination thereof.

35. The polymer composite according to embodiment 34, wherein the at least one fiber is selected from the group consisting of carbon fibers, glass fibers, basalt fibers, silica fibers, quartz fibers, alumina fibers, silicon carbide fibers, nylon fibers, polyester fibers, polyethylene fibers, polypropylene fibers, aramid fibers, acrylic fibers, hemp fibers, jute fibers, kenaf fibers, and any combination thereof.

36. The polymer composite according to any one of the embodiments 25-35, wherein the filler is a particle selected from the group consisting of pigments and solid additives.

37. The polymer composite according to embodiment 36, wherein the particle is selected from the group consisting of talc, mica, clay, nanoclay, calcium carbonate, aluminum hydroxide, titanium oxides, and silica.

38. The polymer composite according to any one of the embodiments 25-37, wherein the sizing agent comprises a polyvinyl alcohol.

39. The polymer composite according to embodiment 38, wherein the polyvinyl alcohol is a partially hydrolyzed polyvinyl alcohol, an intermediately hydrolyzed polyvinyl alcohol, a fully hydrolyzed polyvinyl alcohol, or a super-fully hydrolyzed polyvinyl alcohol.

40. The polymer composite according to embodiment 44, wherein the filler is a glass fiber.

41. The polymer composite according to embodiment 49, wherein the glass fiber is made from glass having a grade selected from the group consisting of C, D, E, modified E, R, and S.

42. The polymer composite according to any one of the embodiments 28-48, wherein the filler is a carbon fiber.

43. The polymer composite according to embodiment 51, wherein the carbon fiber is selected from the group consisting of low modulus carbon fibers, standard modulus carbon fibers, intermediate modulus carbon fibers, high modulus carbon fibers, and super-high modulus carbon fibers.

44. The polymer composite according to any one of the embodiments 25-43, wherein the sizing agent further comprises at least one additional film former.

45. The polymer composite according to embodiment 44, wherein the at least one additional film former is selected from the group consisting of polypropylene dispersions, polyurethane dispersions, epoxy dispersions, polyester dispersions, polyvinylacetate dispersions, phenoxy solutions, nylon dispersions, and any combination thereof.

46. The polymer composite according to embodiment 44 or 45, wherein the at least one additional film former is present in the sizing agent in an amount of up to 50% by weight, based on the total weight of the sizing agent.

47. The polymer composite according to any one of the embodiments 25-46, further comprising at least one coupling agent and/or at least one processing aid.

48. The polymer composite according to embodiment 56, wherein the at least one coupling agent is selected from the group consisting of Volan, silane, titanate, and any combination thereof and the at least one processing aid is selected from the group consisting of lubricants, antistatic agents, antioxidants, nucleating agents, crosslinkers, and any combination thereof.

49. The polymer composite according to any one of the embodiments 25-48, further comprising at least one cationic lubricant and at least one anti-static agent.

50. The polymer composite according to any one of the embodiments 25-49, wherein the filler is a continuous fiber in the form of a spool, tow, roving, fabric, or mat.

51. The polymer composite according to any one of the embodiments 28-58, wherein the filler is a continuous fiber in the form of a roving and the composite is a long fiber thermoplastic composite.

52. The polymer composite according to any one of the embodiments 25-51, wherein the filler is a chopped fiber.

53. The polymer composite according to embodiment 52, wherein the length of the chopped fiber is in the range of from 0.1 to 4.0 inches.

54. The polymer composite according to embodiment 52, wherein the length of the chopped fiber is in the range of from 0.1 to 2.0 inches.

55. The polymer composite according to any one of the embodiments 25-54, wherein the content of the sized reinforcing filler in the polymer composite is in the range of from 1 to 80% by weight, based on the total weight of the polymer composite.

56. The polymer composite according to any one of the embodiments 25-55, wherein the polymer composite further comprises at least one coupling agent.

57. The polymer composite according to embodiment 56, wherein the at least one coupling agent is selected from the group consisting of acids, aldehydes, acid-grafted polyolefins, and anhydride-grafted polyolefins.

58. The polymer composite according to embodiment 56, wherein the at least one coupling agent is selected from the group consisting of (poly)acrylic acid, amic acid, fumaric acid, dicarboxylic acid, oxalic acid, malonic acid, citric acid, maleic acid, glutaraldehyde, acetaldehyde, butyraldehyde, formaldehyde, acrylic acid-grafted polypropylenes, maleic anhydride-grafted polypropylenes, itaconic anhydride-grafted polypropylenes, succinic anhydride-grafted polypropylenes, and any combination thereof.

59. An article comprising the polymer composite according to any one of the embodiments 25-57.

60. The article of claim 59, wherein the article is selected from the group consisting of unidirectional reinforced thermoplastic tapes, randomized continuous mats, long chopped mats, pelletized long compounds, and extruded long logs.

61. The article according to embodiment 60, wherein the article is selected from automotive parts, appliance parts, and electronic parts.

62. The article according to embodiment 60, wherein in the article is selected from the group consisting of automotive door liners, front end modules, air intake manifolds, bumper beams, motorbike boots, car cooling fan blades, air conditioner fan blades, pump housings, automotive body panels, dashboard carriers, multi-wing impellers, lift gates, truck liners, automotive vertical panels, instrument panel carriers, door panel structures, seating structures, under hood components, gasoline doors, mirror housings, front end carriers, dash board carriers, door base plates, underbody covers, front undertrays, washing machine tubs, airbag housings, business machines, electronics packaging, and hard disk drives.

63. The polymer composite of embodiment 56, wherein the thermoplastic polymer is a polypropylene and the at least one coupling agent is selected from the group consisting of (poly)acrylic acid, amic acid, fumaric acid, dicarboxylic acid, oxalic acid, malonic acid, citric acid, maleic acid, glutaraldehyde, acetaldehyde, butyraldehyde, formaldehyde, acrylic acid-grafted polypropylenes, maleic anhydride-grafted polypropylenes, itaconic anhydride-grafted polypropylenes, succinic anhydride-grafted polypropylenes, and any combination thereof.

64. The polymer composite of embodiment 63, wherein the at least one coupling agent is a maleic anhydride-grafted polypropylene.

The following examples are included to demonstrate preferred embodiments. It should be appreciated by those of skill in the art that the techniques disclosed in the examples which follow represent techniques discovered by the inventor to function well in the practice of the products, compositions, and methods described herein, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

EXAMPLES

The following examples compare the effects on the mechanical properties of various composites reinforced with PVOH-sized fibers versus those reinforced with conventionally sized fibers. Fiber contents are all 30% by weight, based on the total weight of the composite.

Materials Used

Homopolymer polypropylene (Pro-fax 6523) was obtained from Lyondellbasell. Maleic anhydride modified polypropylene homopolymer (For example, Polybond 3200: 2% anhydride-grafted to polypropylene; Polybond 3150: 1.5% anhydride-grafted to polypropylene) were obtained from Addivant. Various grades of polyvinyl alcohol (PVOH) were obtained from KURARAY: POVAL® 3-85 (85% hydrolyzed PVOH), POVAL® 4-88 (88% hydrolyzed PVOH) and POVAL® 5-98 (98% hydrolyzed PVOH). POVAL® 3-85 has a slightly lower solution viscosity than POVAL® 4-88. Styrene maleic anhydride (Xiran SZ15170) was obtained from Polyscope. High Impact Polystyrene (HIPS) was obtained from Chase Plastics. Nylon 6,6 (Zytel 101) was obtained from DuPont and nylon 6 (Ultramid 8202) was obtained from BASF.

Method of Making Composites Reinforced with PVOH-Sized Fibers or Reinforced with Conventionally Sized Fibers The unsized carbon fiber tows were sized with either polyvinyl alcohol (PVOH) or conventional sizing agents (polypropylene, epoxy, or polyurethane dispersions) by dipping the unsized carbon fiber tows in a sizing composition comprising a sizing agent. The sizing agent (PVOH, PP, epoxy, or urethane) was present in an amount of 4-11% by in water, based on the total weight of the sizing composition. The sized tows were then dried in a vertical tower to make sized continuous tows or can be chopped and dried later in an oven. In the Examples shown below, the sized carbon fibers were chopped and dried.

The thermoplastic composites were prepared using a Coperion 27 mm twin-screw extruder. The extruder has 11 zones. Thermoplastic resin (polypropylene, nylon 6, nylon 6,6, styrene maleic anhydride, high impact polystyrene (HIPS)) or a mixture of thermoplastic resins (polypropylene and nylon 6 or nylon 6,6; styrene maleic anhydride and high impact polystyrene (HIPS)) was fed into the hopper in zone one. Sized carbon fiber was metered in at controlled ratio to the resin in zone 6. The extruded strands were pelletized and dried for injection molding. The injection molding was done on an 85-ton JSW (Japan Steel Works) all-electrical machine to obtain an ISO (International Organization for Standardization) tensile test bar (Total length: 170 mm. the dogbone area: 8 mm long, 10 mm wide, and thickness: 4 mm).

The mechanical properties of the tensile bars were tested using ASTM method D638 for tensile strength, tensile modulus, and elongation at break; ASTM D790 for flexural strength and modulus; and ASTM D256 for Izod impact strength.

Example (Control) 1—Comparison of Mechanical Properties of Polypropylene Composites Reinforced with Carbon or Glass Fibers Sized with Conventional Sizing Agents: Polypropylene, Epoxy, or Urethane Dispersions Since epoxy and polyurethane dispersions are the two most widely used film-formers used for sizing fibers for reinforcing thermoplastic composites, the respective mechanical properties of polypropylene-based composites containing carbon and glass fibers sized with these dispersions are compared to those of carbon and glass fibers sized with a polypropylene dispersion. As shown in Tables 1 and 2, polypropylene composites reinforced with carbon or glass fibers sized with polypropylene dispersion exhibit superior properties with regard to tensile strength, tensile modulus, tensile elongation, flexural strength, flexural modulus, and notched and unnotched Izod impact compared to those reinforced with epoxy or urethane dispersion-sized carbon or glass fibers. In particular, tensile strength, flexural strength, and unnotched impact are superior with a polypropylene-based sizing chemistry, indicating superior adhesion and compatibility of the polypropylene matrix resin and polypropylene sizing chemistry.

TABLE 1

Polypropylene Composites with 30% Carbon Fiber Sized with Conventional Sizing Agents (Polypropylene, Epoxy and Urethane)

| Size on Carbon Fiber | | Polypropylene | Epoxy | Urethane |
|---|---|---|---|---|
| Resin Matrix | | 98.5% polypropylene + 1.5% maleic anhydride modified polypropylene by weight | | |
| Tensile | Strength (MPa) | 106 | 73 | 65 |
| | Modulus (MPa) | 7859 | 7691 | 7219 |
| | Elongation (%) | 3.1 | 1.3 | 1.4 |
| Flexural | Strength (MPa) | 163 | 101 | 89 |
| | Modulus (MPa) | 14866 | 16021 | 14945 |
| Izod Impact (J/M) | Notched | 23 | 14 | 16 |
| | Unnotched | 106 | 36 | 47 |

TABLE 2

Polypropylene Composites with 30% Glass Fiber Sized with Conventional Sizing Agents (Polypropylene and Urethane)

| Size on Glass Fiber | | Polypropylene | Urethane |
|---|---|---|---|
| Resin Matrix | | 98.5% polypropylene + 1.5% maleic anhydride modified polypropylene by weight | |
| Tensile | Strength (MPa) | 87 | 61 |
| | Modulus (MPa) | 4508 | 4277 |
| | Elongation (%) | 4.5 | 2.3 |
| Flexural | Strength (MPa) | 158 | 93 |
| | Modulus (MPa) | 8968 | 9876 |
| Izod Impact (J/M) | Notched | 109 | 43 |
| | Unnotched | 531 | 173 |

Example 2—Comparison of Mechanical Properties of Polypropylene Composites Reinforced with Carbon Fibers Sized with Polyvinyl Alcohol to Polypropylene Composites Reinforced with Carbon Fibers Sized with Polypropylene As previously stated, polypropylene dispersions are the current size of choice for sizing fibers used for polypropylene reinforcement among fiber producers. However, as shown in Table 3, polypropylene composite reinforced with polyvinyl alcohol-sized carbon fibers exhibits superior mechanical properties over polypropylene composites reinforced with carbon fibers sized with the state-of-the-art polypropylene size. The observed improvement is most significant with regard to tensile elongation and impact strength, although improvements in tensile strength and flexural strength were also observed. The polypropylene composite showed an increase in the tensile and flexural strengths by at least 10% and surprisingly, over 200% increase in the impact strength when carbon fibers were sized with PVA as compared to when carbon fibers were sized with polypropylene.

TABLE 3

Polypropylene Composites with 30% by weight of Carbon Fiber Sized with Polyvinyl Alcohol and Conventional Sizing Agent such as Polypropylene

| Size on Carbon Fiber | | Polyvinyl Alcohol (POVAL® 4-88) | Polypropylene | % change over polypropylene size |
|---|---|---|---|---|
| Resin Matrix | | 98.5% polypropylene + 1.5% maleic anhydride modified polypropylene by weight | | |
| Tensile | Strength (MPa) | 102 | 93 | 10 |
| | Modulus (MPa) | 6132 | 6159 | 0 |
| | Elongation (%) | 4.7 | 2.7 | 74 |
| Flexural | Strength (MPa) | 178 | 148 | 20 |
| | Modulus (MPa) | 18042 | 17558 | 3 |
| Izod Impact (J/M) | Notched | 37 | 18 | 205 |
| | Unnotched | 189 | 90 | 210 |

Example 3—Determination of the Effect of Degree of Hydrolysis of Polyvinyl Alcohol on Mechanical Properties of Polypropylene Composites Reinforced with Polyvinyl Alcohol-Sized Carbon Fibers In Example 2, polyvinyl alcohol, available as POVAL® 4-88 from Kuraray was used and the results are summarized in Table 3. However, any other suitable grade of polyvinyl alcohol can be used, such as, for example, grades POVAL® 3-85 and POVAL® 5-98. Table 4 summarizes the results of a polypropylene composite reinforced with polyvinyl alcohol-sized carbon fibers using POVAL® 3-85 and POVAL® 5-98 and shows that these grades of polyvinyl alcohol results in similar outcome as POVAL® 4-88. The number "88" means 88% of the hydroxyl groups of the polyvinyl alcohol are hydrolyzed. In order to determine the effect, if any, of hydrolysis of PVOH on mechanical properties, other partially and fully hydrolyzed polyvinyl alcohols, POVAL® 3-85 and POVAL® 5-98, were also tested. POVAL® 3-85 is 85% hydrolyzed and has a slightly lower solution viscosity than POVAL® 4-88. POVAL® 5-98 is 98% hydrolyzed. Both POVAL® 3-85 and POVAL® 5-98 were also made into aqueous solutions and used to size chopped fibers. As shown in Table 4, use of the polyvinyl alcohols to size the reinforcing carbon fibers again results in polypropylene composites exhibiting superior mechanical properties than those reinforced with carbon fibers reinforced with polypropylene dispersion. It was also observed that the degree of hydrolyzation of polyvinyl alcohol has insignificant effect on the respective mechanical properties of those composites reinforced with polyvinyl alcohol-sized carbon fibers:

TABLE 4

Polypropylene Composites with 30% Carbon Fiber Sized with Polyvinyl Alcohol with Different Degree of Hydrolysis and Conventional Sizing Agent such as Polypropylene

| Size on Carbon Fiber | | 85% hydrolyzed PVOH | 98% hydrolyzed PVOH | Polypropylene |
|---|---|---|---|---|
| Resin Matrix | | 98.5% polypropylene + 1.5% maleic anhydride modified polypropylene by weight | | |
| Tensile | Strength (MPa) | 108 | 114 | 90 |
| | Modulus (MPa) | 7525 | 7308 | 6378 |
| | Elongation (%) | 4.1 | 3.9 | 2.1 |
| Flexural | Strength (MPa) | 198 | 194 | 159 |
| | Modulus (MPa) | 17872 | 17500 | 17322 |
| Izod Impact (J/M) | Notched | 31 | 33 | 16 |
| | Unnotched | 174 | 177 | 76 |

Example 4—Effect of Crosslinking Between Polyvinyl Alcohol Maleic Anhydride Moieties on Mechanical Properties of Polypropylene Composites Reinforced with Polyvinyl Alcohol-Sized Carbon Fibers The improvement observed from using polyvinyl alcohol size over other sizes is a result of cross-linking of the hydroxyl groups of polyvinyl alcohol with the anhydride functionalities in Polybond. With Polybond, there is anhydride functionality in the resin matrix. As shown in Table 5, the polypropylene composite reinforced with polyvinyl alcohol-sized fibers that contains Polybond is stronger than the polypropylene composite reinforced with polypropylene-sized fiber. Although Table 5 shows that Polybond can be present in the polypropylene resin in an amount in the range of 1.5-6% by weight, however, any suitable amount of Polybond in polypropylene resin can be used. It should be noted in Table 5 that polypropylene composite reinforced with carbon fiber sized with PVOH comprising 4.5% Polybond has mechanical properties similar to that with 6% Polybond. Furthermore, increasing the amount of Polybond from 4.5% to 6% did not result in additional significant benefit that would outweigh the cost benefit analysis, as Polybond is expensive. Hence, the optimal concentration of Polybond in PP resin can be less than 6% or between 1.5% to 4.5%.

TABLE 5

Effect of the amount of coupling agent on the mechanical properties of polypropylene composite reinforced with 30% carbon fiber sized with PVOH and conventional sizing agent-polypropylene

| Size on Carbon Fiber | | PVOH | PP | PVOH | PP | PVOH | PP | PVOH | PP | PVOH | PP |
|---|---|---|---|---|---|---|---|---|---|---|---|
| % maleic anhydride modified polypropylene by weight | | 0 | 0 | 1.5 | 1.5 | 3 | 3 | 4.5 | 4.5 | 6 | 6 |
| Tensile | Str (MPa) | 57 | 78 | 101 | 102 | 115 | 105 | 120 | 110 | 117 | 113 |
| | Mod (MPa) | 6591 | 6744 | 7731 | 6947 | 7592 | 7426 | 7726 | 7483 | 7220 | 7737 |
| | Elong (%) | 1.0 | 1.6 | 2.2 | 2.9 | 4.1 | 2.6 | 4.3 | 2.7 | 4.1 | 2.8 |
| Flexural | Str (MPa) | 82 | 118 | 158 | 135 | 173 | 149 | 176 | 150 | 171 | 153 |
| | Mod (MPa) | 16907 | 17069 | 16919 | 16647 | 15998 | 15573 | 15837 | 15592 | 15240 | 15991 |
| Izod Impact (J/M) | Notched | 16 | 15 | 17 | 16 | 31 | 29 | 35 | 27 | 35 | 24 |
| | Unnotched | 26 | 47 | 107 | 59 | 182 | 106 | 176 | 148 | 191 | 126 |

Example 5—Hydrothermal Stability of Tensile Strength, Modulus, and Elongation of Polypropylene Composites Reinforced with Polyvinyl Alcohol-Sized Carbon Fibers The polypropylene resin in the dispersion has very low degree of grafting of maleic anhydride. Thus, the interfacial bonding with the surface of the fiber is far from optimal. With polyvinyl alcohol as the film-former in sizing, the surface of the fiber is covered with hydroxyl groups. As a result, all of the anhydride functional groups in the Polybond are fully reacted with the hydroxyl groups of the polyvinyl alcohol, resulting in an interfacial bond that is much stronger. This is reflected in the superior water resistance exhibited by the composite. In this experiment, tensile specimens of polypropylene-based composites reinforced with polyalcohol-sized carbon fibers are immersed in a water bath of distilled water and held at 90° C. for four weeks.

All composites, thermoplastic or thermoset, lose tensile strength after the first few days in hot water. However, as shown in Table 6, polypropylene composites reinforced with 30% polyvinyl alcohol-sized carbon fibers retain 100% of its original tensile strength after 2 weeks immersion in hot water.

TABLE 6

| | \multicolumn{8}{c|}{Tensile Strength (MPa)} |
|---|---|---|---|---|---|---|---|---|
| Size on Fiber | PVOH | PP | PVOH | PP | PVOH | PP | PVOH | PP |
| % maleic anhydride modified polypropylene by weight | 1.5 | 1.5 | 3 | 3 | 4.5 | 4.5 | 6 | 6 |
| 0 weeks | 101 | 102 | 115 | 105 | 120 | 110 | 117 | 113 |
| 1 week | 73 | 84 | 107 | 81 | 124 | 79 | 123 | 83 |
| 2 weeks | 65 | 82 | 98 | 78 | 116 | 75 | 123 | 70 |
| 4 weeks | 66 | 85 | 91 | 77 | 98 | 74 | 111 | 71 |
| \multicolumn{9}{|c|}{Strength retention (%)} |
| 1 week | 72% | 82% | 93% | 77% | 103% | 72% | 105% | 73% |
| 2 week | 64% | 80% | 85% | 74% | 97% | 68% | 105% | 62% |
| 4 week | 65% | 83% | 79% | 73% | 82% | 67% | 95% | 63% |

TABLE 7

| | \multicolumn{8}{c|}{Tensile Modulus (MPa)} |
|---|---|---|---|---|---|---|---|---|
| Size on Fiber | PVOH | PP | PVOH | PP | PVOH | PP | PVOH | PP |
| % maleic anhydride modified polypropylene by weight | 1.5 | 1.5 | 3 | 3 | 4.5 | 4.5 | 6 | 6 |
| 0 weeks | 7731 | 6947 | 7592 | 7426 | 7726 | 7483 | 7220 | 7737 |
| 1 week | 7331 | 8644 | 8371 | 8381 | 9461 | 8381 | 8756 | 8627 |
| 2 weeks | 6376 | 7153 | 6329 | 6928 | 7387 | 6821 | 7131 | 6404 |
| 4 weeks | 6070 | 7298 | 7061 | 7379 | 7190 | 7292 | 7109 | 7041 |

TABLE 8

| | Tensile Elongation (%) | | | | | | | |
|---|---|---|---|---|---|---|---|---|
| Size on Fiber | PVOH | PP | PVOH | PP | PVOH | PP | PVOH | PP |
| % maleic anhydride modified polypropylene by weight | 1.5 | 1.5 | 3.0 | 3.0 | 4.5 | 4.5 | 6.0 | 6.0 |
| 0 weeks | 2.2 | 2.9 | 4.1 | 2.6 | 4.3 | 2.7 | 4.1 | 2.8 |
| 1 week | 1.6 | 1.3 | 2.3 | 2.3 | 2.7 | 1.3 | 3.0 | 1.3 |
| 2 weeks | 1.9 | 1.5 | 2.7 | 1.5 | 3.0 | 1.4 | 3.3 | 1.4 |
| 4 weeks | 1.8 | 1.5 | 2.2 | 1.4 | 2.3 | 1.3 | 2.8 | 1.3 |

Example 6—Hydrothermal Stability of Impact Strength of Polypropylene Composites Reinforced with Polyvinyl Alcohol-Sized Carbon Fibers The impact specimens were immersed in a water bath of distilled water and held at 90° C. for four weeks. After ageing, the improved impact strength results confirmed the improved tensile strengths exemplified above. As shown in Table 9, polypropylene-based composites reinforced with polyvinyl alcohol-sized carbon fibers exhibit superior water resistance compared to their counterparts reinforced with polypropylene-sized carbon fibers.

TABLE 9

| | Size on Fiber | PVOH | Polypropylene |
|---|---|---|---|
| Thermoplastic resin | | 98.5% polypropylene + 1.5% maleic anhydride modified polypropylene by weight | |
| Unnotched Izod Impact Strength | 0 weeks | 177 | 76 |
| | 1 week | 167 | 42 |
| | 2 weeks | 148 | 41 |
| | 4 weeks | 113 | 37 |

Example 7—Comparison of Mechanical Properties of Nylon 6,6 and Nylon 6 Composites Reinforced with Carbon Fibers Sized with Polyvinyl Alcohol to Nylon 6,6 and Nylon 6 Composites Reinforced with Carbon Fibers Sized with Polyurethane The PVOH-sized carbon fiber is useful to all engineering thermoplastics. Due to its high strength, toughness, and thermal resistance, nylon (i.e., PA, polyamide) has the largest share of thermoplastic composites. It is particularly important in reinforced thermoplastics. Table 10 summarizes the mechanical properties of 30% by weight carbon fiber-reinforced nylon 6,6 and nylon 6. The resin matrices are DuPont Zytel 101 for nylon 6,6 and BASF Ultramid 8202 for nylon 6. The data demonstrates that polyvinyl alcohol size performs equivalently to the more expensive polyurethane dispersion (PUD) size, which is the most common sizing for reinforcing fibers for nylon.

TABLE 10

| Size on Fiber | | PVOH | PUD | PVOH | PUD |
|---|---|---|---|---|---|
| Thermoplastic Resin Matrix | | Nylon 6,6 | | Nylon 6 | |
| Tensile | Strength (MPa) | 232 | 233 | 209 | 207 |
| | Modulus (MPa) | 9444 | 9712 | 8631 | 8541 |
| | Elongation (%) | 3.7 | 3.6 | 3.9 | 3.6 |
| Flexural | Strength (MPa) | 358 | 349 | 334 | 324 |
| | Modulus (MPa) | 21812 | 22473 | 21693 | 21056 |
| Izod Impact (J/M) | Notched | 25 | 27 | 25 | 26 |
| | Unnotched | 220 | 223 | 259 | 212 |

Example 8—Comparison of Mechanical Properties of Nylon, Polypropylene, and Nylon/Polypropylene Alloy Composites Reinforced with 30% Carbon Fibers Sized with Polyvinyl Alcohol to Nylon, Polypropylene, and Nylon/Polypropylene Alloy Composites Reinforced with 30% Carbon Fibers Sized with Polyurethane or Polypropylene For over 50 years, OEMs have desired to blend polypropylene (PP) with Nylon 6,6 (PA) to reduce cost and weight. Polyurethane dispersion (PUD) is commonly used as sizing for fibers for nylon. But fibers sized with PUD exhibit very poor properties when used to reinforce polypropylene. On the other hand, polypropylene dispersion is a great size for fibers for reinforcing PP, but fibers sized with PP do not perform well when used to reinforce nylon. Until now, an optimal size for fibers used to reinforce PA/PP alloys has not been found. As shown in Table 11, polyvinyl alcohol (PVOH) size offers a great balance.

TABLE 11

| | Tensile | | | Izod Impact (J/M) | |
|---|---|---|---|---|---|
| | Str (MPa) | Mod (MPa) | Elong (%) | Notched | Unnotched |
| 100% PA (Nylon 6,6) | | | | | |
| PUD | 242 | 10922 | 3.4 | 40 | 229 |
| PP | 234 | 10554 | 3.4 | 31 | 212 |
| PVOH | 239 | 10866 | 3.5 | 37 | 230 |
| 50% PA/50% PP | | | | | |
| PUD | 154 | 9112 | 3.1 | 27 | 151 |
| PP | 152 | 8469 | 3.5 | 26 | 158 |
| PVOH | 156 | 8487 | 3.2 | 32 | 161 |
| 100% PP | | | | | |
| PUD | 65 | 7219 | 1.4 | 16 | 47 |
| PP | 90 | 6378 | 2.1 | 16.0 | 76 |
| PVOH | 114 | 7308 | 3.9 | 33 | 177 |

Figure 2:
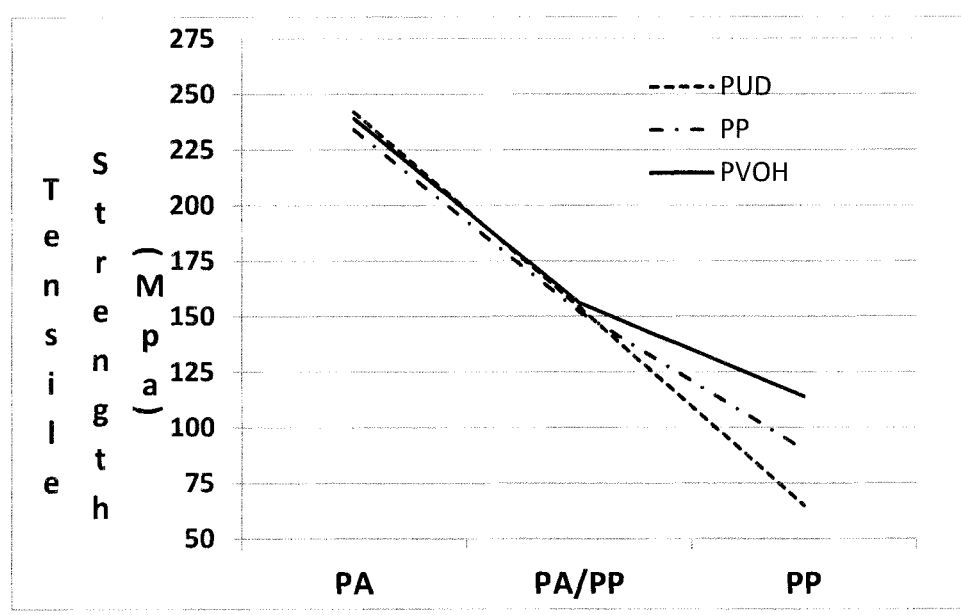
FIG. 2 graphically depicts a comparison of the tensile strengths of 100% nylon, 100% polypropylene, and 50% nylon/50% polypropylene alloy-based composites reinforced with polyvinyl alcohol-, polyurethane-, and polypropylene-sized carbon fibers.
Figure 3:
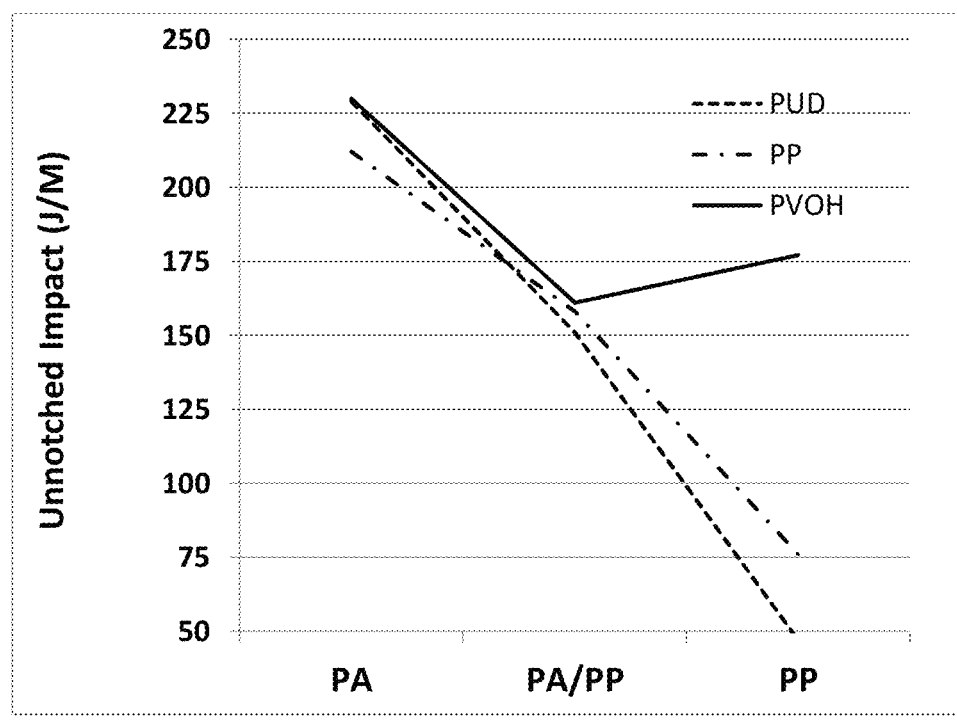
FIG. 3 graphically depicts a comparison of the unnotched impact strengths of 100% nylon, 100% polypropylene, and 50% nylon/50% polypropylene alloy-based composites reinforced with polyvinyl alcohol-, polyurethane-, and polypropylene-sized carbon fibers.

A comparison of the impact that 30% polyvinyl alcohol-sized carbon fibers have on the mechanical properties (particularly tensile strength and unnotched impact strength) of 100% PA (Nylon 6,6), 100% polypropylene (PP), and 50% PA/50% PP alloy compared to those using 30% PUD- or PP-sized carbon fibers is illustrated in FIG. 2 and FIG. 3. These graphs demonstrate that the beneficial impact of PVOH size on the mechanical properties of PA/PP alloy is superior to that of PUD or PP size when the PP content of the alloy is over 50%.

Example 9

Glass fiber-reinforced styrene maleic anhydride (SMA) is used widely in automotive industry. One of the largest applications is for instrument panels. Epoxy dispersion has been the best choice for sizing on glass fibers. Fiber reinforced pure SMA is too brittle to process. In the compounding, SMA (Xiran SZ15170) from Polyscope is blended with 30% HIPS as the input resin. The table below gives the comparison of PVOH and epoxy sizing on carbon fiber in SMA composites.

TABLE 12

| Size on Fiber | | PVOH | Epoxy |
|---|---|---|---|
| Thermoplastic Resin Matrix | | 70% SMA + 30% HIPS | |
| Tensile | Strength (MPa) | 111 | 96 |
| | Modulus (MPa) | 21921 | 21283 |
| | Elongation (%) | 0.6 | 0.5 |
| Flexural | Strength (MPa) | 204 | 175 |
| | Modulus (MPa) | 24265 | 24733 |
| Izod Impact (J/M) | Notched | 28 | 20 |
| | Unnotched | 113 | 107 |

As shown in Table 12, the SMA composite reinforced with 30% carbon fiber sized with PVOH has superior strengths in tensile, flexural and impact properties as compared to the SMA composite reinforced with epoxy-sized carbon fibers.

Example 10

Because it has lower cost, mineral filled polyolefin is larger in production volume than fiber reinforced-polyolefin. Minerals like calcium carbonate or talc are powers. It is very dusty during compounding. It is desirable to make the powders into solid pellets with binder or size for easy processing. Polypropylene dispersion is a natural choice for the size. Calcium carbonate, Hubercarb Q3, is obtained from Huber Engineering Materials. Two samples were prepared from Hubercarb Q3 in the lab. One is coated with polypropylene dispersion and the other is coated with polyvinyl alcohol solution. Both are dried in forced air oven at 125° C. These two experimental samples and the untreated Hubercarb Q3 are compounded into polypropylene at 20% weight content.

TABLE 13

| Thermoplastic Resin Matrix | 80% by weight | 97% polypropylene + 3% maleic anhydride modified polypropylene | | |
|---|---|---|---|---|
| Filler | 20% by weight | Calcium Carbonate (Hubercarb Q3) | | |
| Size | | None | 3% PVOH | 15% Polypropylene |
| Tensile | Strength (MPa) | 35 | 38 | 35 |
| | Modulus (MPa) | 1855 | 1881 | 1840 |
| | Elongation (%) | 7.2 | 7.2 | 7.1 |
| Flexural | Strength (MPa) | 45 | 48 | 44 |
| | Modulus (MPa) | 3552 | 4250 | 4076 |
| Izod Impact (J/M) | Notched | 47 | 36 | 40 |
| | Unnotched | 607 | 302 | 590 |

The purpose of adding minerals to polyolefin is to improve the heat resistance and to increase stiffness of the composites. PVOH size gives highest flexural modulus which represents stiffness of the composites. The molded bars are also tested for their torsional moduli by rheometer. FIG. 4 is the scan of entire temperature range from 30° C. to 180° C. FIG. 5 is the enlarged graph between 30° C. and 100° C. From this, it is clearly shown that PVOH size offers superior stiffness improvement on mineral-filled polyolefin composite.

Example 11—Carbon Fiber Tows Sized with PVOH and Epoxy Dispersion in a Thermoset Epoxy Composite Continuous carbon fiber tows were first sized with a PVOH dispersion or an epoxy dispersion. Each single tow was dipped in a liquid epoxy-anhydride bath and wound onto a flat panel. The panel was then cured in an oven at 80° C. for four hours. After curing, the panel was cut into pieces for measurement of inter laminar shear strength (ILSS), in accordance with ASTM method D2344. ILSS is the most widely used test method in the composite industry to measure the interfacial strength between reinforcing fibers and resin matrix.

TABLE 14

| Size on Carbon Fiber | PVOH | Epoxy |
| --- | --- | --- |
| Thermoset Resin matrix | Epoxy- Anhydride | |
| ILSS (MPa) | 51.1 | 44.4 |

As summarized in Table 14, the test results confirm the advantage of PVOH sizing over traditional epoxy sizing in epoxy-anhydride thermoset composite. In a thermoset epoxy composite, the most common curing agents for epoxy are amines or anhydrides. Since polyvinyl alcohol (PVOH) can crosslink anhydride, PVOH sizing in turn can enhance the crosslink density of cured epoxy composite and thereby ILSS.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

What is claimed:

1. A polymer composite comprising:
(a) a thermoset (co)polymer;
(b) at least one sized reinforcing filler comprising a filler and a sizing agent disposed on at least a portion of the filler, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, and wherein the filler is a milled carbon fiber, a chopped carbon fiber, or a combination thereof; and
(c) at least one coupling agent selected from the group consisting of aldehydes, acid-grafted polyolefins, and anhydride-grafted polyolefins,
wherein the milled carbon fiber has a size in the range of 50 to 200 microns, and
wherein the chopped carbon fiber has a length in the range of 1 mm or more and less than 3 mm.

2. The polymer composite of claim 1, wherein the at least one coupling agent is selected from the group consisting of, glutaraldehyde, acetaldehyde, butyraldehyde, formaldehyde, acrylic acid-grafted polypropylenes, maleic anhydride-grafted polypropylenes, itaconic anhydride-grafted polypropylenes, succinic anhydride-grafted polypropylenes, and any combination thereof.

3. The polymer composite of claim 2, wherein the at least one coupling agent is a maleic anhydride-grafted polypropylene.

4. The polymer composite of claim 1, wherein the content of the sized reinforcing filler in the polymer composite is in the range of from 1 to 80% by weight, based on the total weight of the polymer composite.

5. An article comprising the polymer composite of claim 1.

6. A component comprising the article of claim 5, wherein the component is configured for use in one or more of automotive, appliance, and electronic assembly.

7. A method of making a polymer composite comprising the steps of:
a) contacting a sizing agent with at least a portion of a reinforcing filler to form a sized reinforcing filler, wherein the sizing agent comprises at least one of a polyvinyl alcohol, an ethylene/vinyl alcohol copolymer, a silane-grafted polyvinyl alcohol and a silane-grafted ethylene/vinyl alcohol copolymer, a silane-grafted polyvinyl alcohol and a silane-grafted ethylene/vinyl alcohol copolymer,
wherein the filler is a milled carbon fiber, a chopped carbon fiber, or a combination thereof,
wherein the milled carbon fiber has a size in the range of 50 to 200 microns, and
wherein the chopped carbon fiber has a length in the range of 1 mm or more and less than 3 mm and
b) compounding the sized reinforcing filler with a polymer and at least one coupling agent selected from the group consisting of aldehydes, acid-grafted polyolefins, and anhydride-grafted polyolefins, wherein the polymer comprises a thermoset (co)polymer.

8. The method of claim 7, wherein the at least one coupling agent crosslinks with the sizing agent, thereby forming a crosslinked sizing agent disposed over at least a portion of the sized reinforcing filler.

9. The method of claim 7, further comprising adding up to 10% by weight of sizing agent to the polymer before the step of the step of compounding the sized reinforcing filler with the polymer and the at least one coupling agent.

10. The polymer composite of claim 1, wherein the coupling agent is present in an amount of 1.5 wt % to 10 wt %, based on the total weight of the polymer composite.

11. The polymer composite of claim 1, wherein the at least one coupling agent is selected from aldehydes and anhydride-grafted polyolefins.

* * * * *